R. W. UHLIG.
TYPE WRITING MACHINE.
APPLICATION FILED JULY 17, 1909.
1,069,359.
Patented Aug. 5, 1913.
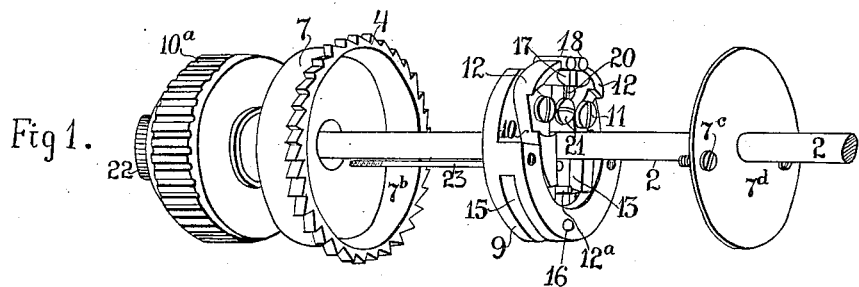
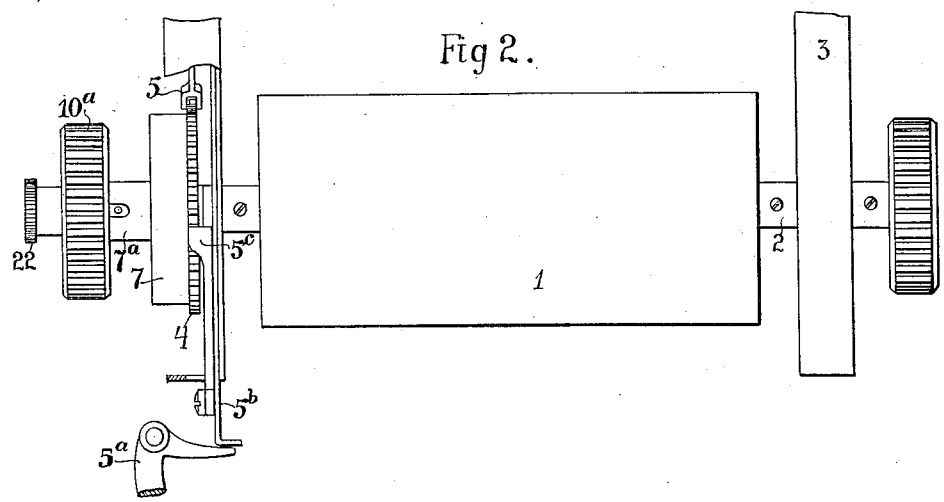
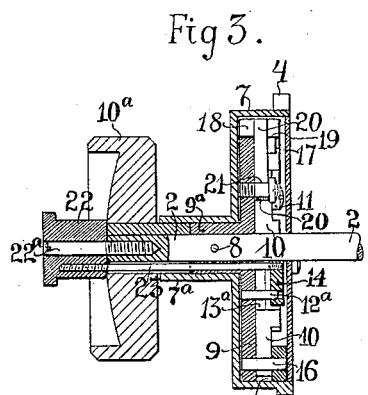
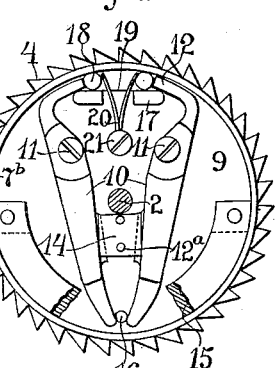
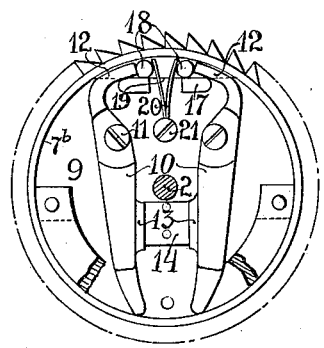
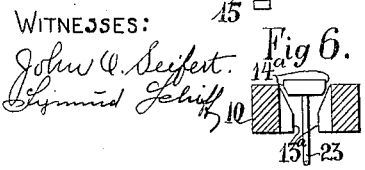
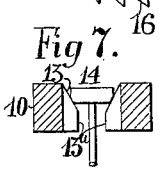
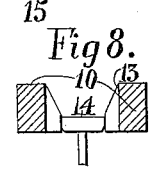
WITNESSES:
John W. Seifert.
Sigmund Schiff.
INVENTOR:
Richard W. Uhlig,
By B. C. Stickney,
ATTORNEY.

UNITED STATES PATENT OFFICE.

RICHARD W. UHLIG, OF RUTHERFORD, NEW JERSEY, ASSIGNOR TO UNDERWOOD TYPEWRITER COMPANY, OF NEW YORK, N. Y., A CORPORATION OF NEW JERSEY.

TYPE-WRITING MACHINE.

1,069,359.

Specification of Letters Patent.   Patented Aug. 5, 1913.

Application filed July 17, 1909.   Serial No. 508,169.

*To all whom it may concern:*

Be it known that I, RICHARD W. UHLIG, a citizen of the United States, residing in Rutherford, in the county of Bergen and State of New Jersey, have invented certain new and useful Improvements in Type-Writing Machines, of which the following is a specification.

The present invention relates to clutch mechanism for releasably connecting the platen to the line space wheel of a typewriting machine to permit the platen to be rotated independently of the line-space wheel.

The principal object of the invention is to provide an improved form of a clutching mechanism for this purpose that will be simple in construction, positive in action, inexpensive to manufacture, and readily applicable to existing machines, particularly with a view to rendering the platen releasable by means of a device which is movable endwise of the platen, and which during its releasing movement has no tendency to rotate the platen or associated parts.

I provide a platen-releasing button at the end of the usual platen axle and outside of the hand wheel which is usually provided for rotating the platen; and by means of this button I operate a clutch mechanism which is contained within a drum that may be carried by or form part of the line-space wheel itself; whereby said wheel is clutched to the platen axle or to a part fixed thereon. A spring is provided, tending to close the clutch, and this spring returns said button to normal position when it is released. I make provision, however, whereby an extra movement given to the button will lock the clutching members in operative positions, so that the platen will remain released from the line space wheel without attention from the operator. Mounted rigidly upon the platen axle is a disk or head having bearing surfaces upon which are mounted rollers, said surfaces inclined to the inner periphery of the drum of the line space wheel. Springs mounted upon the head bear against the rolls to wedge or jam them in opposite directions against the inner periphery of the drum. The releasing mechanism comprises a pair of levers, and a device operated by the button to rock the levers and release the rollers.

In the accompanying drawings, Figure 1 is a view in perspective of parts partly disassembled. Fig. 2 is a plan view of the platen and platen frame of an Underwood front strike writing machine, showing the present improvements applied thereto. Fig. 3 is a vertical sectional view of the clutching mechanism. Fig. 4 is an end view, showing the parts of the clutching mechanism in normal effective positions. Fig. 5 is a similar view showing the clutch unlocked. Figs. 6, 7 and 8 illustrate the different positions of the clutching levers. Fig. 6 shows them in normal positions, in cross-section; Fig. 7 shows them separated to release the clutch, and Fig. 8 shows them locked in releasing positions.

The usual cylindrical platen 1 is mounted rigidly upon an axle 2, journaled in a platen frame 3. A toothed line space wheel 4 is engaged by a spring detent 5, and operated by a lever $5^a$, through a slide $5^b$ and pawl $5^c$, in the usual manner.

The line space wheel is illustrated in the form of a drum 7, on whose periphery are formed the teeth 4. This drum has a hub or collar $7^a$ to turn loosely upon a hub or collar $9^a$ of a disk or head 9, which is fixed by a pin 8 to the axle 2. The axle and platen may be rotated while the line space wheel or drum 6 remains stationary.

Upon lugs 17 formed on head 9, are formed bearing surfaces along the line 19, upon which run rollers 18. The surfaces 19 are inclined to the inner periphery $7^b$ of the drum, and the rollers 18 are normally pressed into the bite of the surfaces 19 and periphery $7^b$ by means of springs 20, secured by a screw 21 to the head 9.

Releasing levers 10, fulcrumed to the head 9 at 11 are provided with fingers or bent ends 12, to bear against the rollers and disengage them from the inner periphery of the drum, to permit rotation of the platen independently of the line space wheel. The movements of the levers 10 are effected by a double wedge or separating member 14, which is movable in a direction parallel with the platen axle and is guided by a pin $12^a$ upon the head 9. Said wedge engages inclined projections or cams 13 of the levers 10, to rock the latter. To the wedge 14 is connected a pull rod 23, the outer end of which extends through suitable perforations in the hub $9^a$, etc., and at its outer end is threaded into a button or finger piece 22, which is slidably arranged upon a stud 22ª threaded into the end of the platen axle.

When the button 22 is drawn out, the levers 10 are separated as at Fig. 7, and the rolls are released. It will be understood that the double wedge 14 engages the cam projections 13 of the levers, wedging them apart, so that their other ends will force the friction rolls 18 toward each other and out of contact with the drum, against the tension of springs 20. Upon releasing the button, the springs 20 restore the parts to normal effective positions.

The double cam 14 is provided with straight or dwell portions 14ª; and the lever cams are provided with corresponding straight or dwell portions 13ª; and by giving the button 22 an extra movement in the same direction (toward the left at Fig. 3) the levers are forced a little farther apart, and the dwell portions 14ª are forced between the dwell portions 13ª, whereby the levers are locked in platen-releasing positions, as at Fig. 5; and there is no tendency for the button 22 to return to normal position. Hence both hands of the operator are left at liberty to manipulate the paper or turn the platen by means of finger-wheel 10ª on the end of the platen axle. By a touch upon the end of the button 22, the wedge member 14 may be pushed in and the springs 20 permitted to restore the parts to their normal effective positions.

It will be seen that the clutching mechanism is very compactly arranged, inasmuch as the releasing levers 10 extend transversely to the platen axle 2, each lever being pivoted between its ends to release one of the oppositely acting rolls 18, and the head or cam 14 being arranged to engage the levers on the opposite side of the platen axle 2 from said clutching rolls 18, whereby the levers may be of ample size for the work required of them, and room is afforded for the levers and for their mountings, and also for the releasing cam without extending the device unduly in a direction longitudinally of the platen axle; or in other words, a very thin space can conveniently contain the whole clutching and releasing mechanism.

The extremities of the levers 10 may be guided in a slot 15 provided in the head 9; and the levers may rest against a stop pin 16. The stem 23 passes through hand wheel 10ª, the button 22 being at the outer side of 10ª. A disk 7ᵇ held by screws 7ᶜ to the plate 9 may serve as a cover for the drum.

Variations may be resorted to within the scope of the invention, and portions of the improvements may be used without others.

Having thus described my invention, I claim:

1. In a typewriting machine, the combination with a platen and a disk or head connected thereto, of a line-space wheel having a periphery, opposite bearing surfaces on said head and inclined to said periphery, rolls running on said bearing surfaces, springs to press said rolls oppositely into the bite of said periphery and said bearing surfaces, levers mounted on said head to release said rollers, a button movable in the direction of the platen axis, means to enable said button to move said levers simultaneously to release said rolls, and means to enable the button by a further movement in the same direction to lock said levers in roll releasing positions.

2. In a typewriting machine, the combination with a platen and a platen axle, of a disk or head fixed on the platen axle, a line-space wheel, clutching devices between said head and said line-space wheel, a stud or bearing fixed to and projecting from the end of said platen axle, a button mounted to slide upon said stud or bearing, and a rod extending from said button to said clutching devices to operate the same.

3. In a typewriting machine, the combination with a platen and a platen axle, of a disk or head fixed on the platen axle, a line-space wheel, clutching devices between said head and said line-space wheel, a stud or bearing fixed to and projecting from the end of said platen axle, a button mounted to slide upon said stud or bearing, and a rod extending from said button to said clutching devices to operate the same; yielding means being provided to return said clutching devices to normal positions, and also to enable said button by a further movement to lock said clutching devices in released positions.

4. In a typewriting machine, the combination with a platen and a disk or head connected thereto, of a line-space wheel having a periphery, opposite bearing surfaces on said head and inclined to said periphery, rolls running on said bearing surfaces, springs to press said rolls oppositely into the bite of said periphery and said bearing surfaces, levers mounted on said head to release said rollers, a wedge mounted to engage said levers, a rod connected to said wedge, a button connected to said rod, an axle on which said platen and said head are mounted, and a stud upon which said button is mounted, said stud projecting from the end of said platen axle.

5. In a typewriting machine, the combination with a platen and an axle therefor, of a line-space wheel having a friction ring or drum and loosely mounted on the platen axle, and a clutch mechanism disposed within and operating upon the drum and comprising a head fast upon the platen axle, a pair of rollers mounted upon said head and disposed between the latter and the drum, a spring mounted upon and bearing against the rollers to cause the latter to engage the periphery of the drum, means for releasing the rollers from the drum, comprising a pair of dogs or levers fulcrumed upon said head and having bent or inturned ends engaging the rollers, cam projections provided adjacent to the ends of said dogs or levers, a wedge to contact with said projections and slidable parallel with the platen axle, a draw pin connected to the wedge, and a button mounted at one end of the platen axle and connected to said draw pin to cause the wedge to act upon said projections to rock the levers and disengage the rollers from the drum.

6. The combination with a platen, a platen axle, a line-space wheel, and a connecting clutch comprising oppositely acting rolls, of a pair of levers to release the rolls, each lever mounted between its ends, said levers extending transversely of the platen axle past the same, and means upon the opposite side of the platen axle from said rolls, to engage said levers to release the rolls.

7. The combination with a platen, a platen axle, a line-space wheel, and a connecting clutch comprising oppositely acting rolls, of a pair of levers to release the rolls, each lever mounted between its ends, said levers extending transversely of the platen axle past the same, and means upon the opposite side of the platen axle from said rolls, both to engage said levers to release the rolls and also to lock the levers mechanically in roll-releasing position.

8. The combination with a platen, a platen axle, a line-space wheel, and a connecting clutch comprising oppositely acting rolls, of a pair of levers to release the rolls, each lever mounted between its ends, said levers extending transversely of the platen axle past the same, and means upon the opposite side of the platen axle from said rolls, to engage said levers to release the rolls; said releasing means comprising a cam to engage the levers, a stem or rod connected to said cam, and a finger-piece at the end of said rod.

9. The combination with a platen, a platen axle, a line-space wheel, and a connecting clutch comprising oppositely acting rolls, of a pair of levers, one for each roll, a device on which said levers are mounted to extend transversely of the platen axle, said levers mounted to vibrate in a plane transverse to the platen axle, and a releasing head movable longitudinally of the platen axle to engage said levers to swing them to clutch-releasing position.

RICHARD W. UHLIG.

Witnesses:
JOHN O. SEIFERT,
K. FRANKFORT.

Copies of this patent may be obtained for five cents each, by addressing the "Commissioner of Patents, Washington, D. C."